United States Patent
Weinstein et al.

[15] 3,694,500
[45] Sept. 26, 1972

[54] CATALYTIC OXIDATION OF POLYMETHYLSTILBENE COMPOUNDS

[72] Inventors: Benjamin Weinstein, Morganville; Burton Maxwell Rein, East Brunswick, both of N.J.

[73] Assignee: Mobil Oil Corporation

[22] Filed: Sept. 26, 1969

[21] Appl. No.: 861,451

[52] U.S. Cl. ...........................................260/524 R
[51] Int. Cl. ..............................................C07c 63/02
[58] Field of Search ..................................260/524 R

[56] References Cited

UNITED STATES PATENTS

| | | | |
|---|---|---|---|
| 1,945,032 | 1/1934 | Demant | 260/524 |
| 2,833,816 | 5/1958 | Saffer et al. | 260/524 |
| 3,036,122 | 5/1962 | Ardis et al. | 260/524 |

OTHER PUBLICATIONS

Cram et al., J. Am. Chem. Soc. 81, 5983– 87 (1959)

Primary Examiner—Lorraine A. Weinberger
Assistant Examiner—R. S. Weissberg
Attorney—Oswald G. Hayes, Andrew L. Gaboriault and James F. Snowden

[57] ABSTRACT

The catalytic oxidation of a polymethyl-substituted stilbene compound with molecular oxygen in a liquid reaction mixture containing a lower fatty acid (e.g., acetic acid) as the reaction solvent, a soluble cobalt compound as the oxidation catalyst and preferably a reaction activator (e.g., methyl ethyl ketone, etc.) produces a benzene polycarboxylic acid as exemplified by the oxidation of 4,4'-dimethylstilbene to terephthalic acid.

4 Claims, No Drawings

CATALYTIC OXIDATION OF POLYMETHYLSTILBENE COMPOUNDS

BACKGROUND OF THE INVENTION

1. Field of the Invention

This invention relates to the cobalt-catalyzed, liquid phase oxidation of stilbene compounds having one or more methyl substituents on each of the benzene rings in which all oxidizable methyl substituents as well as both of the carbon atoms in the ethylene group are converted to carboxyl radicals in producing benzene polycarboxylic acids.

2. Prior Art

The oxidation of alkyl-substituted benzenes by means of oxygen-rich gases to form the corresponding benzene carboxylic acids in a liquid reaction medium containing a cobalt compound as the catalyst is well known as is the use of various reaction initiators or activators to minimize the induction period and enable a benzene polycarboxylic acid to be produced in a single reaction stage.

There are a number of reports in the prior art of reacting certain methyl-substituted stilbenes with several oxidizing agents to produce various benzene carboxylic acids. For example, W. Q. Beard and C. R. Hauser reported in J. Org. Chem. 25, 333–343 (1960) that 4,4'-dimethylstilbene was oxidized to para-toluic acid by refluxing for 18 hours in 3N nitric acid. D. J. Cram and R. H. Bauer in J.A.C.S. 81, 5963–71 (1959) described the oxidation of p,p'-dimethylstilbene with chromic oxide in acetic acid at 100° C. as yielding terephthalic acid, and also the ozonization of the same starting material with oxidative workup in the usual manner as producing p-toluic acid.

P. S. Bailey and J. G. Burr, Jr. reported in J.A.C.S. 75, 2951–2955 (1953) that 1-phenyl-2-mesitylethylene (2,4,6-trimethyl stilbene) could not be oxidized by chromic acid in acetic acid whereas potassium permanganate in acetone oxidized it to "a mixture of benzene polycarboxylic acids." In J. Org. Chem. 8, 64–66 (1943), Fuson, Denton and Best indicated that ozonolysis of the same starting material in chloroform formed benzoic acid, 2,4,6-trimethylbenzoic acid and a small amount of 2,4,6-trimethylphenol; and they also described the ozonolysis of 2,4,6,2',4',6'-hexamethylstilbene in chloroform as producing 2,4,6-trimethylbenzoic acid and a small quantity of 2,4,6-trimethylphenol.

It is apparent from the previous work described that different products were obtained in oxidizing methylstilbenes with different oxidizing agents. Moreover, none of the prior oxidations of such materials apparently involved either the use of a catalyst or employing molecular oxygen (i.e., $O_2$ either undiluted or in a mixture such as air) as the actual oxidant.

It has now been discovered that polymethyl-substituted stilbenes can be oxidized with molecular oxygen in a single stage in a suitable liquid medium at elevated temperatures in the presence of a cobalt-containing catalyst and usually of a reaction activator or reaction initiating agent to produce benzene polycarboxylic acids rather than intermediate oxidation products. Thus, there is essentially complete conversion of both the linking ethylenic carbon atoms and the oxidizable nuclear methyl substituents in the stilbene compound. This result was not predictable in view of the varying results obtained in the aforesaid prior art oxidations, and it is quite surprising in view of the fact that the reaction of gaseous oxygen with 4-methylstyrene (the most closely related methyl-substituted mononuclear starting material to 4,4140-dimethylstilbene) under substantially the same reaction conditions produced the intermediate oxidation product, p-toluic acid in 75 percent yield in an acetic acid solution catalyzed by cobalt acetate and activated by methyl ethyl ketone in contrast with the high yields of terephthalic acid obtained from 4,4'-dimethylstilbene in the instant process.

Terephthalic acid is probably the most important of the benzene carboxylic acids as it is currently employed in large quantities in the manufacture of polyethylene terephthalate for the fabrication of fibers, filaments, tapes, etc.

SUMMARY OF THE INVENTION

The present invention relates to a process for the production of a benzene polycarboxylic acid by the catalytic reaction of molecular oxygen with a methylated aromatic compound wherein methyl radicals are converted into carboxyl radicals in forming said benzene polycarboxylic acid in a liquid reaction mixture containing a fatty acid having from two to four carbon atoms as the reaction solvent and an oxidation catalyst comprising a soluble cobalt compound, and the invention is characterized by the improvement which comprises reacting a methylated aromatic compound having the formula:

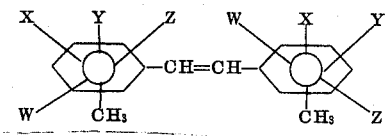

wherein W, X, Y and Z individually represent the same or different members of the group consisting of hydrogen and halogen atoms, and methyl radicals as well as inert tertiary alkyl, aryl, cyano, nitro,

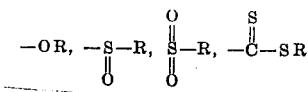

—COOR, —COOH and —COOM radicals in which each R individually designates a monovalent saturated hydrocarbyl radical (i.e., an alkyl, cycloalkyl, aryl, alkaryl, or aralkyl group) containing from one to 24 or more carbon atoms and M represents NH4 or a salt-forming metal ion; to thereby produce a benzene polycarboxylic acid having the formula:

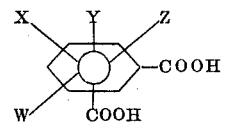

The W, X, Y and Z atoms or radicals each remain unchanged during the reaction except in the case of initially designating an additional oxidizable nuclear methyl group in the methylated aromatic reactant that is oxidized to an additional carboxyl radical in the product acid.

Narrower aspects of the invention relate to preferred starting materials, such as symmetrically substituted stilbene compounds, and particularly 4,4'-dimethylstibene, as well as the incorporation of a reaction activating agent in the reaction mixture, as exemplified by a bromine-containing substance or a methylenic ketone, and especially methyl ethyl ketone which is often preferred for the purpose.

DESCRIPTION OF SPECIFIC EMBODIMENTS

The instant process may be employed to advantage in the oxidation of a wide variety of stilbene compounds containing at least one oxidizable methyl radical attached to each benzene ring. These methyl groups are converted along with the two methenyl radicals in the ethylenic group into carboxyl radicals by catalytic oxidation in which the stilbene compound is split at the double bond in forming mononuclear benzene polycarboxylic acids of corresponding orientation relative to the ethylene radical and those methyl groups in the starting material. In addition to this plurality of oxidizable radicals, suitable stilbene compounds may also contain one or more other nuclear substituents which are inert to oxidation under the reaction conditions disclosed herein; and these may be exemplified by chlorine, bromine, iodine and fluorine atoms; nitro, cyano, sulfonyl, sulfoxy and sulfonate radicals; carboxylic groups as well as esters thereof and ammonium or alkali metal (e.g., Na, K and Li) salts thereof; other ester radicals of the -CSSR type as defined previously; hydrocarbyl ether groups; aryl, and tertiary alkyl radicals, and the carbon content of each of the organic substituents may range from the minimum for that type of organic radical up to 24 or more carbon atoms.

Treatment of a polymethyl stilbene compound of the aforesaid type under the reaction conditions described hereinafter results in the efficient and rapid production of the desired aromatic polycarboxylic acid by the oxidation of nuclear methyl radicals accompanied by the splitting and oxidation of the linking ethylenic group to form an additional carboxyl radical on each of the benzene rings. Thus, assuming complete oxidation, two moles of benzene polycarboxylic acid product are obtained from each mole of the starting material that is split in the reaction. In general, it is preferred to employ a symmetrically substituted methylstilbene compound in the reaction in order to direct the reaction toward the formation of a single benzene polycarboxylic acid as the chief product and facilitate its isolation, but unsymmetrical stilbene starting materials (i.e., those having substituents differing in type or number or arranged in different orientation on each of the benzene rings) may be utilized, especially in cases where it is desired to produce a mixture of the aromatic acids. In addition to the oxidation of 4,4'-dimethylstibene to terephthalic acid, other conversions which can be made according to the present process include oxidizing 3,3'-dimethylstilbene to isophthalic acid, 2,2'-dimethylstilbene to phthalic acid, 3,5,3',5'-tetramethylstilbene to trimesic acid, 3,3'-dimethyl-4,4'-di-tert-butylstilbene to 4-tert-butyl-1,3-benzene dicarboxylic acid, 2,4,6,2',4',6'hexamethylstilbene to 1,2,3,5-benzene tetracarboxylic acid, 2,4,2',4'-tetramethylstilbene (as well as 2,4,3,',4'-tetramethylstilbene and 3,4,3',4'-tetramethylstilbene) to trimellitic acid, 2,4,5,2',4',5'-hexamethylstilbene to pyromellitic acid, 3,3'-dimethyl-4,4'-diphenylstilbene to 4-phenyl-1,3-benzene dicarboxylic acid, 4,4'-dimethyl-2,3'-dicarbomethoxystilbene to 2-carbomethoxyterephthalic acid, 3,3'-dimethyl-4,4'-dicarboxystilbene to trimellitic acid, 4,4'-dimethyl-3,3'-dimethoxystilbene to 2-methoxyterephthalic acid, 4,4'-dimethyl-3,3'-dichlorostilbene to 2-chloroterephthalic acid, 3,3'-dimethyl-4,4'-dinitrostilbene to 4-nitro-1,3-benzene dicarboxylic acid, 2,2'-dimethyl-4,4'-dibromostilbene to 4-bromoortho-phthalic acid, 3,3'-dimethyl-4,4'-dicyanostilbene to 4-cyano-1,3-benzene dicarboxylic acid, 4,4'-dimethyl-3,3'-dimethanesulfonylstilbene to methyl-(2,5-dicarboxyphenyl)-sulfone, 3,3'-dimethyl-4,4'-dibenzenesulfonatostilbene to 2,4-dicarboxyphenylbenzene sulfonate, 4,4'-dimethyl-3,3'-dibenzoylstilbene to 2-benzoylterephthalic acid, and 4,4'-dimethyl-3,3'-dithiomethylthionostilbene to 2-thiomethylthionoterephthalic acid. In the present process, it is immaterial whether the substituted stilbene reactant is in the cis or the trans form or a mixture of the two inasmuch as the product is the same in all cases.

The stilbene compound may be the sole starting material undergoing oxidative conversion to the desired polycarboxylic acid or it may be oxidized jointly with a polymethylbenzene compound, the latter preferably having the same orientation of methyl groups and any inert substituents as the stilbene reactant. For example, a mixed charge of 4,4'-dimethylstilbene and p-xylene may be oxidized to terephthalic acid in accordance with the process of this invention.

In carrying out the process of this invention, the stilbene compound is oxidized at a suitably elevated reaction temperature in the liquid phase in admixture or solution in a liquid reaction medium in the form of a saturated fatty acid containing from two to four carbon atoms per molecule, i.e., acetic, propionic or butyric acids or mixtures thereof. Acetic acid is the preferred reaction solvent. The proportion of stilbene compound in the charge is governed in many instances by the handling characteristics of the reaction mixture, for the present method is suitable for continuous as well as batch operations, and consideration should be given to the pumping characteristics of a reaction product slurry containing a substantial concentration of suspended solid particles of a benzene polycarboxylic acid. Accordingly, the polymethyl stilbene reactant is usually employed in an amount ranging from about 2 to 35 percent by weight of the total liquid charge, and the range of about 10 to 25 percent is often preferred for minimizing the volume of material to be handled with due attention to avoiding pumping difficulties. The fatty acid reaction solvent usually constitutes a major proportion of the remainder of the charge and typically amounts to more than half of the total liquid charge.

The oxidation reaction is catalyzed by a cobalt salt or compound in solution in the reaction mixture. This substance may desirably be incorporated in the form of a cobalt salt of a lower alkanoic acid corresponding to the fatty acid reaction solvent, that is cobalt (II) acetate, propionate or butyrate or mixtures thereof, in an amount corresponding to about 0.1 to 4 percent by weight of cobalt metal based on the weight of said reaction solvent; and a quantity between about 0.05 to 1 percent cobalt is usually recommended. Other cobalt compounds may also be employed as exemplified by cobaltous nitrate hexahydrate, cobaltous carbonate, cobaltic acetylacetonate and cobalt hydrate [$Co(OH)_2$ or $CoO.H_2O$]. Also combination catalysts containing compounds of cobalt and of other metals may be used as described hereinafter.

It is generally preferable to have a small amount of water present in the charge mixture, for instance between about 0.5 and 10 percent of the weight of the total liquid charge, in order to obtain more rapid and efficient oxidation by facilitating solution of the cobalt compound; larger amounts of water are not desirable and may reduce the reaction rate considerably even in the presence of an activator. In adjusting the water concentration of the charge, consideration should be given to the water content of other components of the mixture, particularly any water of crystallization in the cobalt compound utilized and also in the reaction solvent, such as glacial acetic acid; and it is often unnecessary to add water as such.

The oxidation is effected by contacting the reaction mixture with a gas containing molecular oxygen, preferably at partial pressures of oxygen ranging from about 15 to 1,000 pounds per square inch, and more preferably in the range of about 150 to 700 pounds per square inch. Lower pressures may be employed in order to moderate the oxidation reaction when a highly reactive starting material is used or when high concentrations of activator are present. Higher pressures are advantageous in speeding up the reaction when that is desirable. While air, or air enriched with oxygen, may be used to advantage, gaseous oxygen of commercial purity is preferred. In any event, the total pressure in the reactor must be high enough to maintain a substantial liquid phase in the reaction mixture at the elevated reaction temperature.

The process of the instant invention may be carried out under conditions which have previously been proposed for the cobalt-catalyzed, liquid phase oxidation of methyl benzenes, etc. to benzene carboxylic acids using molecular oxygen as the oxidizing gas. In many cases it is preferred to oxidize the substituted stilbene generally according to the conditions described in the Ardis et al. U.S. Pat. No. 3,036,122, wherein the starting material is mixed with a reaction solvent in the form of a fatty acid containing from 2 to 4 carbon atoms, a cobalt-containing catalyst, a small amount of water which is sufficient to dissolve the cobalt compound and about 1 to 10 percent or more of a methylenic ketone as the reaction activator or initiator based on the weight of fatty acid solvent; accordingly, the disclosure of that patent is incorporated here by reference. That process involves the use of methyl ethyl ketone as the preferred activating agent or other methylenic ketones, such a methyl n-propyl ketone, diethyl ketone, 2,4-pentanedione, and 2,5-hexanedione. The temperature should not exceed about 145° C. in such systems but it may be as low as 90° C. in oxidizing stilbene compounds, and the range of about 110°–140° C. is usually preferred. Other reaction activators such as n-butanol and aldehydes, as exemplified by acetaldehyde, may be employed singly or in combination with a ketone activator.

Other combinations of an activator with a catalytic cobalt compound may be employed in the instant method of oxidizing stilbene compounds, and Saffer et al. U.S. Pat. No. 2,833,816 is incorporated here by reference as to the disclosure of the activating effect of bromine in oxidizing various alkyl benzenes in acetic acid solution at usually higher temperatures in the range of about 120°–275° C., and preferably about 170°–225° C.; the catalytic material may also contain compounds of manganese or other specified heavy metals along with the cobalt compound. A desirable amount of bromine in the charge may range from about 0.1 to 10 atoms per atom of cobalt, and the cobalt and bromine may be supplied to the reaction as cobaltous bromide. A system utilizing the bromine activator together with a cobalt salt oxidizes all nuclear methyl groups in the stilbene compound to carboxyl groups; whereas ortho-oriented nuclear methyl groups, that is methyl radicals on nuclear carbon atoms adjacent to other methyl-substituted carbon atoms and to the nuclear carbon atom attached to the linking ethylene group are not oxidized but remain inert throughout the reaction in the case of a ketone activator.

Also, combination catalysts may be employed for catalyzing the oxidation of the substituted stilbene compound according to the method of Ichikawa U.S. Pat. No. 3,299,125 for oxidizing p-xylene at temperatures of preferably 80° to 130° C. with molecular oxygen and a fatty acid reaction solvent in the presence of a catalytic combination of a soluble cobalt compound and a soluble zirconium compound in an atomic ratio between about 1 and 100. Compounds of other metals that have nonvariable valences in Groups IIIa and IVa of the Periodic Table (e.g., hafnium) may be substituted in place of the zirconium compound in the catalyst combination. While the presence of a ketone activator is often desirable, the process may be operated without a reaction activating agent in at least some instances, and it may improve the yield in certain cases, as where a relatively small amount of an activator is employed.

Under the conditions described herein, the desired oxidation occurs rapidly, generally starting with little or no induction period in batch operations, with a high degree of conversion of the selected polymethylstilbene reactant to the desired polycarboxylic acid product. The reaction time may be controlled by restricting it to the period required for a predetermined degree of oxidation, generally a conversion about 50 to 95 percent of the starting material to the polycarboxylic acid, and holding the conversion below the maximum obtainable tends to minimize the consumption of methylenic ketone by oxidation in the reaction. However, it may be desirable under certain circumstances to extend the reaction period, especially in a batch process, in order to accomplish higher conversions of starting materials. After the benzene carboxylic acid product has been isolated, the liquid reaction residue can be readjusted to the proper composition and used again for further oxidation with or without purification.

This may be accomplished by distilling off excess water and adding the necessary amounts of the polymethylstilbene reactant and the activator.

Numerous advantages and benefits are derived from the present process in providing for the rapid and efficient catalytic oxidation of stilbene compounds to the desired benzene polycarboxylic acids in a single stage without producing excessive quantities of intermediate or partial oxidation products in the reaction product mixture. The process is equally adaptable to continuous and batch operations, and it is operative with a wide variety of highly substituted stilbenes in forming aromatic acids with 2, 3, 4, 5 or 6 carboxyl groups attached to the benzene ring and up to 4 inert halogen or organic substituents thereon. Besides providing a new precursor for catalytic oxidation to terephthalic acid in the form of 4,4'-dimethylstilbene, other advantages are obtained with this reactant for it evolves 17% less heat than p-xylene during oxidation to a comparable amount of product so that less cooling water is required in controlling the reaction temperature. Also only half as much water is formed in the reaction than from p-xylene for a comparable quantity of product; hence the usual acetic acid reaction solvent can be recovered for reuse at a lower expense for distilling off the excess water. Similarly, less reaction heat is evolved and less water is formed in the oxidation of other substituted stilbene compounds described herein. In addition there are indications that when a mixture of p-xylene and 4,4'-dimethylstilbene is jointly oxidized in the present process, little or no reaction activator is required, since the dimethylstilbene, or possibly a temporary intermediate derivative thereof, apparently exerts a substantial activating effect on the oxidation of the xylene.

For a better understanding of the nature, objects and advantages of this invention, reference should be had to the following illustrative and comparative examples wherein all temperatures are expressed as degrees centigrade and all proportions are by weight unless otherwise stated. The illustrative examples do not necessarily set forth optimum reaction conditions, and they should not be construed as limitations upon the invention.

EXAMPLE 1

A solution of slightly over 100 ml. volume is prepared by dissolving 10.42 g. of 4,4'-dimethylstilbene, 2.49 g. of cobaltous acetate tetrahydrate, and 2.16 g. of methyl ethyl ketone in 104.9 g. of glacial acetic acid at ambient temperature. This solution is placed in a stainless steel autoclave of 300 ml. capacity and subjected to continuous agitation after the vessel is sealed. Oxygen of commercial purity is then introduced to raise the autoclave pressure to 100 psig. and heat is applied to raise the temperature of the charge to 130° C. over a period of about 15 minutes. The pressure in the vessel begins to drop markedly during the preheating stage, which indicates the start of an oxygen-consuming reaction without any significant induction period, and this consumption of oxygen continues for 30 minutes while additional oxygen is being injected intermittently to raise and maintain the oxygen pressure at 250 psig. The reaction is highly exothermic, and the reaction temperature is maintained at 130° C. by cooling the reaction mixture with water flowing through both an external jacket and a cooling coil located within the autoclave. After this, the vessel is cooled to about room temperature; and the product slurry is removed from the vessel, preheated to about 120° C. for filtration which is followed by washing of the filter cake with boiling acetic acid and water. The yield of crude solid terephthalic acid is 11.3 g. or 68 percent of theory, and this solid material contains 3.2 percent p-carboxybenzaldehyde according to a polarographic determination. No 4,4'-dimethylstilbene is detected in the products of this reaction.

EXAMPLE 2

A repeat of Example 1 with a 10 minute longer reaction time provides a yield of 76 percent of the terephthalic acid product with the same content of p-carboxybenzaldehyde.

EXAMPLE 3

The procedure of Example 1 is again repeated except for restricting the oxygen pressure to 125 psig. and not exceeding a temperature of 110° C. in a reaction which produces a 72 percent yield of the crude terephthalic acid product.

EXAMPLE 4

Example 3 is repeated with half of the previous amount of methyl ethyl ketone activator, and the yield of terephthalic acid product is found to be 61 percent of theory.

COMPARATIVE EXAMPLE A

The procedure of Example 1 is repeated with 10.6 grams of p-xylene substituted for the dimethylstilbene in order to provide a charge mixture with essentially the same concentration of aromatic rings on a molar basis as before. In this control experiment, the yield of terephthalic acid product is essentially the same as in Example 2 and the 4.4 percent content of the undesired p-carboxybenzaldehyde is higher; however, there is an induction period, for the reaction does not start until about 25 minutes after reaching the reaction temperature of 130° C. After the induction period, the reaction proceeds for 35 minutes.

EXAMPLE 5

A solution of about 100 ml. volume is prepared by dissolving 10.42 g. of 4,4'-dimethylstilbene, 1.63 grams (0.005 mole) of cobaltous bromide hexahydrate and 1.23 grams (0.005 mole) of manganous acetate tetrahydrate in 104.9 g. of glacial acetic acid. This solution is placed in a HASTELLOY C autoclave of 300 ml. capacity which is equipped for constant agitation of the reaction mixture. After charging the vessel with compressed oxygen of commercial purity, the vessel is heated to a maximum temperature of 175° C. and oxygen is introduced intermittently to raise the pressure to a maximum of 350 psig. No induction period is observed, for the reaction starts with the admission of oxygen and is terminated 12 minutes later when oxygen consumption ceases. After cooling the vessel and subjecting the reaction products to hot filtration and washing as before, the yield of terephthalic acid product is determined to be 79 percent and its p-carboxybenzaldehyde content is 3.7 percent.

COMPARATIVE EXAMPLE B

The procedure of Example 5 is repeated with p-xylene substituted in double molar proportion for the dimethylstilbene. The reaction mixture absorbs oxygen for 23 minutes in producing a solid product which upon filtering and washing is found to amount to 81 percent of the theoretical yield of terephthalic acid and have a content of 4.4 percent p-carboxybenzaldehyde.

EXAMPLE 6

The autoclave described in Example 1 is charged with a mixture of 2.08 grams of 4,4'-dimethylstilbene, 8.49 grams of p-xylene, 2.49 g. of cobaltous acetate tetrahydrate and 104.9 g. of glacial acetic acid. After initially pressuring the closed vessel with oxygen and submitting the charge to suitable agitation, the reaction mixture is heated to 130° C. and maintained at that temperature while supplying sufficient oxygen to maintain the oxygen pressure at 250 psig. After oxygen absorption ceases, the vessel is cooled and the terephthalic acid product separated as before in a good yield which indicates high conversion of both the xylene and the stilbene compound. In view of the absence of a conventional reaction activator in this reaction mixture, it may be postulated that the dimethylstilbene, or possibly an intermediate oxidation product thereof, or both serve to activate the oxidation of xylene.

From the above and other related runs, it appears that while similar yields are obtained, the terephthalic acid produced from p-xylene often has a somewhat higher content of the troublesome p-carboxybenzaldehyde impurity than the oxidation product derived from 4,4'-dimethylstilbene.

Although the present invention has been illustrated in detail by means of a few specific embodiments for the purposes of valid comparisons and full disclosure of the invention, it will be apparent to those skilled in the art that the present invention is not restricted to these illustrative embodiments but also encompasses within its purview many obvious modifications and variations, especially in respect to reaction conditions and starting materials. Accordingly, the present invention should not be construed as limited in any particulars except as may be set forth in the appended claims or required by the prior art.

We claim:

1. In a process for the preparation of a benzene polycarboxylic acid by the catalytic liquid phase oxidation of a methylated aromatic compound with molecular oxygen wherein methyl radicals in said methylated aromatic compound are converted to carboxylic radicals in forming said benzene polycarboxylic acid in a reaction mixture containing a fatty acid having from two to four carbon atoms as the reaction solvent and an oxidation catalyst comprising a soluble cobalt compound, the improvement which comprises reacting 4,4' dimethylstilbene, to thereby produce terephthalic acid.

2. A process according to claim 1 in which a bromine-containing substance is introduced into said reaction mixture.

3. A process according to claim 1 in which a methylenic ketone is introduced into said reaction mixture.

4. A process according to claim 3 in which methyl ethyl ketone is introduced into said reaction mixture.

* * * * *

UNITED STATES PATENT OFFICE
CERTIFICATE OF CORRECTION

PO-1050 (5/69)

Patent No. 3,694,500  Dated September 26, 1972

Inventor(s) Benjamin Weinstein and Burton Maxwell Rein

It is certified that error appears in the above-identified patent and that said Letters Patent are hereby corrected as shown below:

Col. 2  Line 5   "4,4140" should be --4,4'--

Signed and sealed this 6th day of March 1973.

(SEAL)
Attest:

EDWARD M. FLETCHER, JR.
Attesting Officer

ROBERT GOTTSCHALK
Commissioner of Patents